United States Patent
Gupta et al.

(10) Patent No.: US 6,807,603 B2
(45) Date of Patent: Oct. 19, 2004

(54) SYSTEM AND METHOD FOR INPUT/OUTPUT MODULE VIRTUALIZATION AND MEMORY INTERLEAVING USING CELL MAP

(75) Inventors: Ashish Gupta, San Jose, CA (US); Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 10/080,739

(22) Filed: Feb. 22, 2002

(65) Prior Publication Data

US 2003/0163657 A1 Aug. 28, 2003

(51) Int. Cl.[7] .............................................. G06F 12/08

(52) U.S. Cl. ......................... 711/5; 711/157; 711/206; 711/207; 711/208

(58) Field of Search ............................. 711/5, 157, 206, 711/207, 208

(56) References Cited

U.S. PATENT DOCUMENTS

| | | | |
|---|---|---|---|
| 5,293,607 A | 3/1994 | Brockmann et al. | 711/5 |
| 5,530,837 A | 6/1996 | Williams et al. | 711/157 |
| 6,381,668 B1 | 4/2002 | Lunteren | 711/5 |
| 6,393,504 B1 * | 5/2002 | Leung et al. | 710/104 |
| 6,480,943 B1 | 11/2002 | Douglas et al. | 711/157 |
| 6,526,459 B1 * | 2/2003 | Campbell et al. | 710/51 |
| 6,553,478 B1 | 4/2003 | Grossier | 711/209 |

* cited by examiner

*Primary Examiner*—Reginald G. Bragdon

(57) ABSTRACT

A method of accessing a plurality of memories and a plurality of input/output modules includes providing at least one map table, including a plurality of entries. Each entry includes an entry type identifier and a plurality of entry items. A first logical address including a plurality of address bits is received. An entry in the at least one map table is identified based on a first set of the address bits. A type of the identified entry is determined based on the entry type identifier of the identified entry. An entry item in the identified entry is identified based on a second set of the address bits if the entry type identifier indicates an input/output type entry. An entry item in the identified entry is identified based on a third set of the address bits if the entry type identifier indicates a memory type entry.

27 Claims, 4 Drawing Sheets

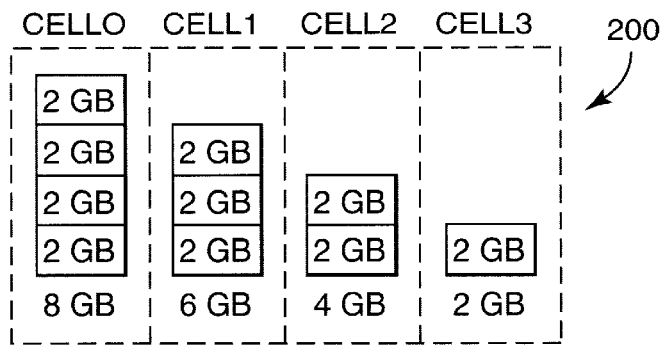
Fig. 2
|     | 000 | 001 | 010 | 011 | 100 | 101 | 110 | 111 |
|-----|-----|-----|-----|-----|-----|-----|-----|-----|
| 305 →| 0 | 1 | 2 | 3 | 0 | 1 | 2 | 3 |
| 310 →| 0 | 1 | 2 | 3 | 4 | 5 | 6 | 7 |
Fig. 3
| 000 | 001 | 010 | 011 | 100 | 101 | 110 | 111 |
|-----|-----|-----|-----|-----|-----|-----|-----|
| 0 | 1 | 2 | 0 | 1 | 2 | 0 | 1 |
| 2 | 0 | 1 | 2 | 0 | 1 | 2 | 0 |
| 1 | 2 | 0 | 1 | 2 | 0 | 1 | 2 |
Fig. 4
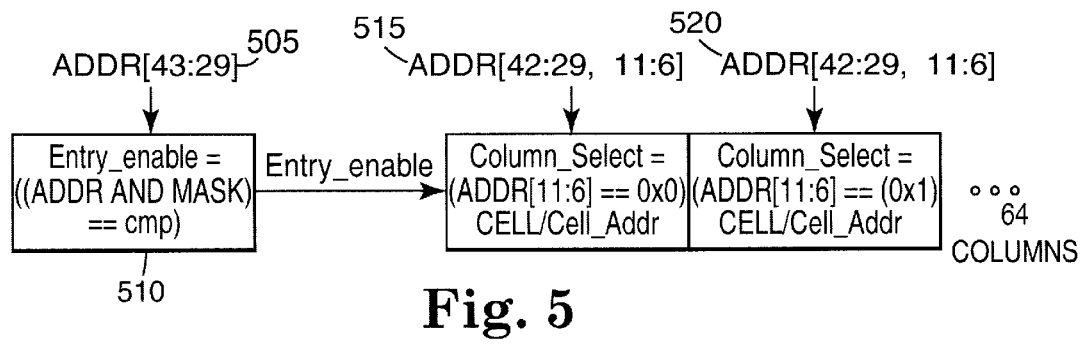
Fig. 5

0000  
0001  } 605
0010  
0011  
0100  
0101  } 610
0110  
0111  
1000  
1001  } 615
1010  
1011  
1100  
1101  } 620
1110  
1111  
Fig. 6
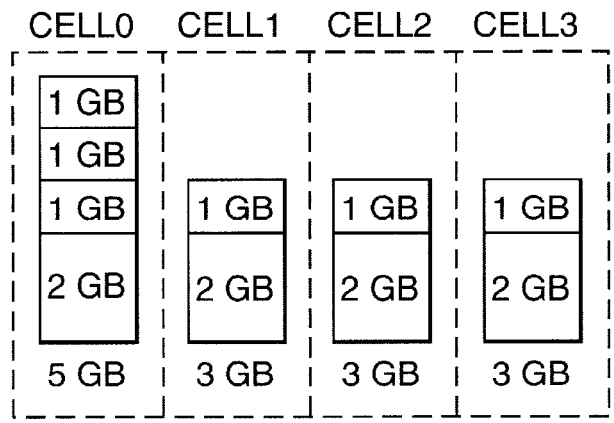
Fig. 7
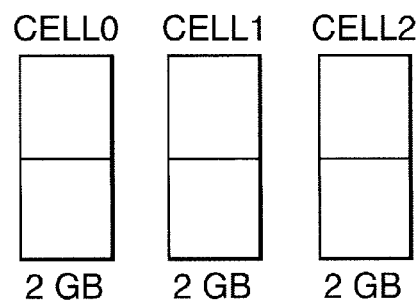
Fig. 8

SYSTEM AND METHOD FOR INPUT/OUTPUT MODULE VIRTUALIZATION AND MEMORY INTERLEAVING USING CELL MAP

CROSS REFERENCE TO RELATED APPLICATIONS

This application is related to U.S. patent application Ser. No. 09/563,018, filed Apr. 29, 2000, entitled MEMORY ADDRESS INTERLEAVING AND OFFSET BITS FOR CELL INTERLEAVING OF MEMORY, now U.S. Pat. No. 6,480,943, which is hereby incorporated herein by reference.

THE FIELD OF THE INVENTION

This invention relates generally to cell maps for computer systems. This invention relates more particularly to a system and method for input/output module virtualization and memory interleaving using cell maps.

BACKGROUND OF THE INVENTION

Historically, main memory was physically situated on a central bus. Within this type of system, memory requests consisting of full physical addresses, were forwarded to the memory subsystem and the data was returned. In a distributed memory system, main memory is physically distributed across many different cells. A cell may consist of a number of processors, an input/output (I/O) device, a cell controller, and memory.

In a distributed system, memory can be non-interleaved or interleaved. Prior art systems of and methods for interleaving memory are described and set forth in, for example, U.S. Pat. No. 5,530,837, entitled METHODS AND APPARATUS FOR INTERLEAVING MEMORY TRANSACTIONS INTO AN ARBITRARY NUMBER OF BANKS, issued Jun. 25, 1996 to Williams et al. and U.S. Pat. No. 5,293,607, entitled FLEXIBLE N-WAY MEMORY INTERLEAVING, issued Mar. 8, 1994 to Brockmann et al. U.S. Pat. Nos. 5,530,837 and 5,293,607 are assigned to the owner of the present invention, and both patents are incorporated herein by reference in their entireties. In a non-interleaved access method wherein memory is divided into or across multiple physical cells, a unified, contiguous block of memory space is addressed by first sequentially accessing all memory of a first cell followed by sequential access of all memory available in a second cell, etc. If each cell has been configured with its maximum amount of possible memory, the memory will appear, and be addressed as one contiguous memory block to the system. However, if not every cell is configured to its maximum memory capability, this non-interleaved scheme may result in holes within the memory space corresponding to missing memory blocks within the cells. Non-interleaved memory also requires multiple, sequential accesses to a particular cell since both instructions and data tend to be used sequentially. While a benefit when stored locally, a processor continuously or frequently accessing a remote memory in another cell consumes significant overhead including processing and communications resources at both the local and remote cells and the connecting network(s). When substantially continuous, these resources may become unavailable to other processes and degrade system performance.

Alternatively, the memory within a distributed memory system can be accessed through an interleaving protocol. Interleaving memory across several cells allows for more uniform access to memory. For example, if a system includes two cells that are connected together through a bus system, with each cell including memory and four separate processors, by interleaving the memory in cell 1 with the memory in cell 2, all eight processors in the system have a more uniform access to each memory location. Interleaving memory across the two cells also ensures consistency in latency delays for each processor in accessing memory locations. Interleaving memory across the two memory locations also reduces the possibility of bottlenecks when processors attempt to access or retrieve information from memory.

As an example of interleaving, assume that the memory contained within a system is distributed across four cells labeled 0, 1, 2, and 3. Further assume that each of cell 0 and cell 1 contain eight gigabytes (GB) of memory, while cells 2 and 3 each contain four GB of memory. The overall system therefore contains twenty-four GB of memory. The distributed memory could be interleaved as follows. Since each of the four cells contains at least four GB of memory, the first interleave entry, entry 0, would contain four GB of memory from each of cell 0, 1, 2, and 3 for a total of sixteen GB of memory. All of the memory available in cell 2 and cell 3 have now been used in interleave entry 0. Cell 0 and cell 1 each contain four GB of unused memory. Interleave entry 1 would contain the four GB of memory from cell 0 and the four GB of memory from cell 1. Interleave entry 1 therefore contains eight GB of memory, four from cell 0 and four from cell 1. The twenty-four GB of memory in the four cells have now been broken out into two interleave entries. The twenty-four GB of memory from the four cells can now be viewed as one contiguous block as follows. GB 0 through 15 are located in the lower half of cells 0, 1, 2, and 3, GB 16 through 23 are located in the upper portion of cells 0 and 1. This interleaving occurs at the cache line level. To a processor, the twenty-four GB of information appears to be one contiguous block. While the twenty-four GB of information appears to be one contiguous block, physically the twenty-four GB of information is distributed among four different cells.

Large computer systems have used cell maps to distribute processor accesses around to avoid hot spots. Cell maps have been used to find destination modules for the cell/node based systems. Cell maps have been used to interleave memory across cells to provide a more uniform access pattern to the memory. Cell map entries have been used to provide one, two, four, eight, sixteen, thirty-two, and sixty-four way interleaving. The size of cell map entries determines how many ways the memory is interleaved.

Some previous systems, as described above, have used cell maps to implement virtualization and interleaving for memory. The interleaving for memory is generally fine-grained, with two addresses to adjacent cache lines going to different modules. Such fine-grained access is not typically needed for input/output (I/O) virtualization.

In previous systems, separate resources were used for mapping memory and I/O. Depending on the system topologies and architecture, and the current needs of the system, the system would "flip-flop" to provide a desired memory or I/O operation. Also, the programming model for interleaved memory and for mapping out I/O modules has been quite different.

It would be desirable to use a single cell map structure to provide both memory interleaving and virtualization for I/O modules.

SUMMARY OF THE INVENTION

One form of the present invention provides a method of accessing a plurality of memories in an interleaved manner and a plurality of input/output modules using a contiguous logical address space. At least one map table is provided. The at least one map table includes a plurality of entries. Each entry includes an entry type identifier and a plurality of entry items. Each entry item includes a module identifier. Each entry is one of a memory type entry and an input/output type entry. A first logical address is received. The first logical address includes a plurality of address bits. An entry in the at least one map table is identified based on a first set of the address bits. A type of the identified entry is determined based on the entry type identifier of the identified entry. An entry item in the identified entry is identified based on a second set of the address bits if the entry type identifier indicates an input/output type entry. An entry item in the identified entry is identified based on a third set of the address bits if the entry type identifier indicates a memory type entry. A module identified by the module identifier of the identified entry item is accessed.

BRIEF DESCRIPTION OF THE DRAWINGS

FIG. 2 is a block diagram illustrating a distributed memory system, with the memory distributed across four cells.

FIG. 3 is a table illustrating four-way and eight-way interleaving.

FIG. 4 is a table illustrating three-way interleaving.

FIG. 5 is a block diagram illustrating a sixty-four-way interleaved cell map entry for single cache line interleaving.

FIG. 6 is a chart identifying distinguishing characteristics among interleaving groups.

FIG. 7 is a block diagram of interleaving across cells containing non-power-of-two memory amounts.

FIG. 8 is a block diagram of interleaving across three cells.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
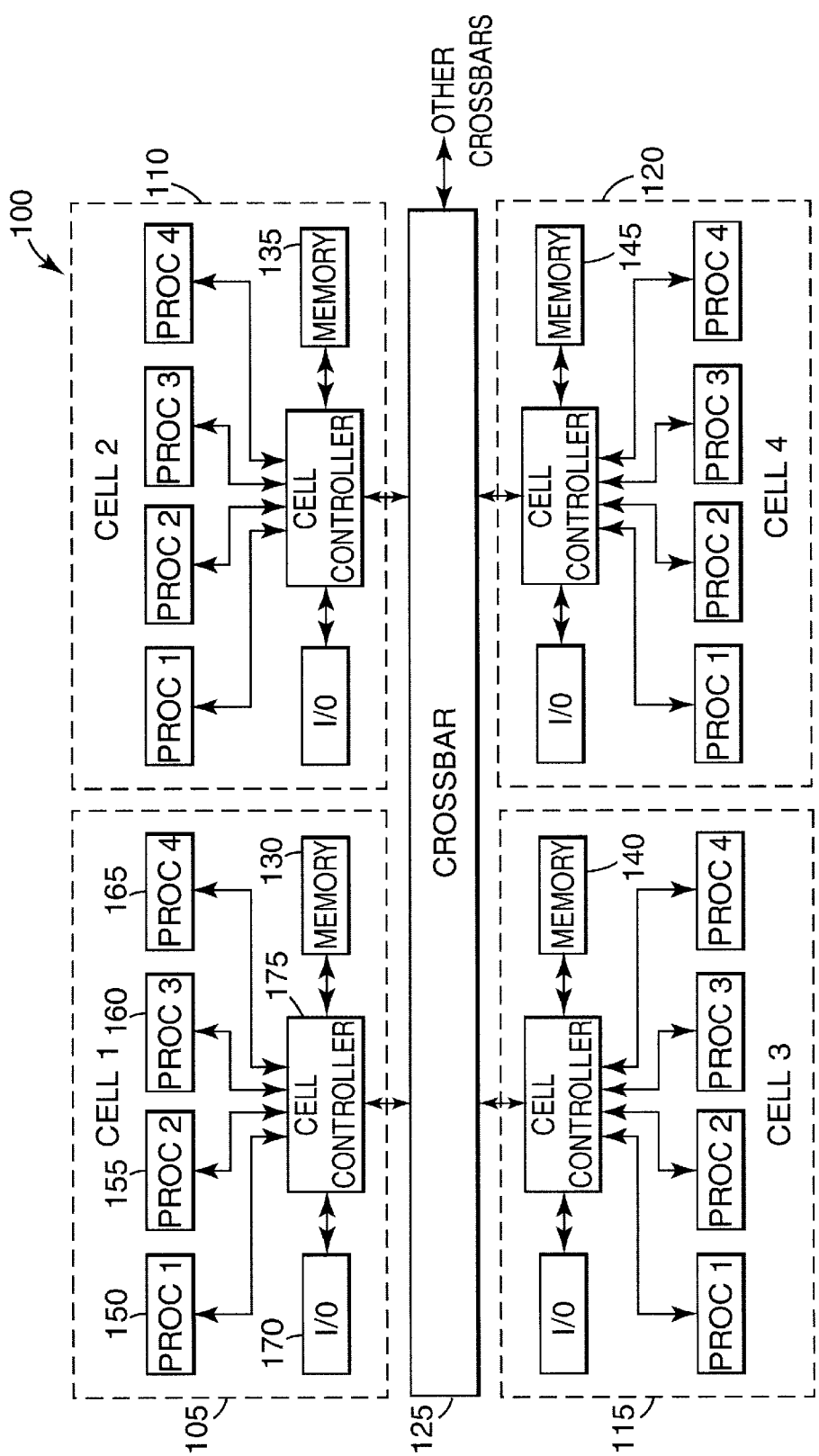
FIG. 1 is a block diagram illustrating a node including four cells and a crossbar.

FIG. 1 is a block diagram illustrating a processing system or node 100, which includes four cells 105, 110, 115 and 120, connected via crossbar 125. Each cell has a corresponding block of memory—memory 130 in cell 105; memory 135 in cell 110; memory 140 in cell 115, and memory 145 in cell 120. Each cell also includes four processors (numbered 150, 155, 160 and 165 for cell 105), an input/output (I/O) module (numbered 170 for cell 105), and a cell controller (numbered 175 for cell 105).

Each of the four processors 150 through 165, and the I/O module 170 require access to memory 130. Cell controller 175 is the interface between both the I/O module 170 and the processors 150 through 165, and the memory 130. In order for a memory-accessing device (e.g., any of the processors 150 through 165, or the I/O module 170) to access a correct portion of memory, the cell controller 175 translates a logical memory address known to the memory-accessing device into a physical address. The physical address allows cell controller 175 to know how to route the memory request. Any of the memory-accessing devices in cell 1 could also access cell 115's memory 140, cell 120's memory 145, or cell 110's memory 135. Cell controller 175 uses a cell map to translate a logical memory address from a memory-accessing device into the proper physical address that can be used to access an appropriate memory. In one embodiment, cell controller 175 contains a different cell map for each memory-accessing device. For the embodiment illustrated in FIG. 1, cell controller 175 would contain five different cell maps, one for each attached memory-accessing device.

One embodiment of a cell map is a table with a plurality of rows and a plurality of columns, where each row corresponds to an interleaving entry, and each column within a row corresponds to an entry item that identifies one of the cells in the system.

FIG. 2 shows a distributed memory system 200 with memory distributed over four cells: cell 0, cell 1, cell 2 and cell 3. Cell 0 contains a total of eight gigabytes (GB) of memory; cell 1 contains six GB of memory; cell 2 contains four GB of memory and cell 3 contains two GB of memory. In one embodiment, interleaving over these four cells is accomplished in the following manner. First, an assessment is made as to which cell has the minimum amount of memory available for interleaving. In this case, cell 3 only contains two GB of memory. Interleaving entry 0 would therefore interleave two GB of memory from cells 0, 1, 2 and 3 for a total of eight GB of memory. The resultant interleaving entry is shown in row 305 of FIG. 3, wherein each row identifies up to eight cell memories. Above row 305 are eight three-bit combinations, with each three-bit combination being associated with one of the eight entry items in row 305 (and row 310). These three-bit combinations are used for identifying a particular entry item, and are discussed in further detail below.

Next, an assessment is made to determine the minimum amount of memory left in any available cell. In this case, it would be two GB in cell 2. Interleaving across cell 0, cell 1 and cell 2 is provided by using three interleaving entries as shown in FIG. 4. Interleaving entries 1, 2, and 3 (the first three rows, respectively, under the three-bit combinations in FIG. 4) are used for the second two GB block of cell 0, the second two GB block of cell 1, and the top two GB portion of cell 2. At this point, interleaving entry 0 addresses a total of eight GB of information, while interleaving entries 1, 2 and 3 each contain two GB of information. Cell 3's memory resources were completely used in interleaving entry 0. Cell 2's memory resources were exhausted through the completion of interleaving entry 3.

The next step in this process is to identify the remaining memory left to be allocated in any of the cells. In this case, two GB of memory are left in cell 1. Interleaving entry 4 would normally contain two GB of memory from cell 0 and two GB of memory from cell 1. This arrangement would add four GB to the already mapped fourteen GB, for a total of eighteen GB. However, it is preferable in one embodiment to start each table entry on an integer multiple of the group size, i.e., at sixteen GB. Thus, two GB needs to be added next to allow the four GB in cells 0 and 1 to occupy one interleaving entry. Therefore, interleaving entry 4 (not shown) represents and maps to the uppermost two GB that reside in cell 0. Now the interleaving entries defined thus far (0, 1, 2, 3 and 4) contain sixteen GB of memory. Interleaving entry 5 (not shown) maps to the remaining two GB that reside in cell 1 and the remaining two GB in cell 0. This is permissible because the sixteen GB allocated so far in entries 0, 1, 2, 3 and 4 is a multiple of four GB. In summary, the twenty GB of memory that is contained in cell 0 through cell 3 is now contained in 6 interleaving entries. The first interleaving entry contains eight GB of information, two GB from each of the four cells. Interleaving entries 1, 2, 3 and 4 have two GB contained within them, and interleaving entry 5 has four GB.

An interleaving group is defined as a unit of a plurality of cells that have the same amount of memory confined for interleaving in a given memory range. An interleaving group is composed of one or more interleaving entries. Interleaving group 0 is composed of the eight GB that reside within interleaving entry 0, or in other words, two GB from each of the four cells. Interleaving group 1 is composed of the six GB that reside within interleaving entries 1, 2 and 3, or in other words, two GB from cell 0, two from cell 1 and two from cell 2. Interleaving group 2 is composed of the uppermost two GB from cell 0 (i.e., interleaving entry 4). Interleaving group 3 is composed of two GB from cell 0 and cell 1 (i.e., interleaving entry 5).

To identify the specific cell that the desired physical memory is located in, a first set of address bits from an incoming memory address are used to identify a row in the cell map, and a second set of address bits from the incoming memory address are used to index into the identified row and identify an entry item. In one embodiment, forty-four bit memory addresses are used, with address bits twenty-nine through forty three corresponding to the first set of address bits, and bits six through eight corresponding to the second set of address bits. Three bits (e.g., bits six through eight) are used for indexing into entries with eight columns or entry items. For entries with sixteen entry items, four bits (e.g., bits six through nine) are used for indexing. Similarly, for each doubling of the entry size, an additional indexing bit is used.

Interleaving is most effective when the amount of consecutive memory accessed is kept small. In interleaving cache lines, the cell map indicates which cells the cache lines are located on. So referring back to interleaving entry 0 (row 305 in FIG. 3), if the cache lines were interleaving between cells 0, 1, 2 and 3, row 305 indicates how the cells would be represented within the table. In one embodiment, the three bits in the plurality of three-bit combinations above row 305 correspond to address bits six through eight of an incoming logical memory address. These three bits of an incoming address are used to index into the row and identify one of the entry items. Each entry item in row 305 identifies one of the four cells. As shown in FIG. 3, if bits six through eight of a memory address are 000, that indicates to the cell controller that the physical address for the memory is in cell 0. A value of 001 for bits six through eight of a memory address indicates to the cell controller that the physical address for the memory is in cell 1. Similarly, each of the other six possible values for bits six through eight of a memory address is used by the cell controller to identify a cell from the table.

Referring again to FIG. 1, a single node with four cells is shown. Each cell has its own memory device. If, however, the overall system had two four-celled nodes, there would be eight cells available, each cell with its own memory. If these cells were labeled cell 0 through cell 7, the memory could be interleaved across all eight cells. Row 310 of FIG. 3 shows how memory could be interleaved over all eight cells. In this case, the three-bit designator (bits six through eight of the memory address) indicates which of the eight cells contains the physical address of the memory. Thus, row 310 illustrates eight-way interleaving, and row 305 illustrates four-way interleaving.

If a system has a three-cell configuration, the cell map would appear as illustrated in FIG. 4, which illustrates three-way interleaving. The three cells would effectively be mapped over three rows in the cell map. The first column of the first row would contain a value for cell 0. The second column of the first row would contain a value for cell 1. And the third column of the first row would contain a value for cell 2. This sequence would be repeated until the last cell ended up in the last column of the third row.

A row in a cell map is identified by the cell controller through a combination of a mask, a comparator, and memory address bits from the memory-accessing device. With the mask, bits of the address that are irrelevant to the determination of the appropriate row are masked out. The comparator compares the masked address portion with match values to identify a corresponding row of the cell map.

FIG. 5 is a block diagram illustrating a sixty-four-way interleaved cell map entry for single cache line interleaving. Since the cell map entry in FIG. 5 is sixty-four-way interleaved, six bits (e.g., bits six through eleven) of a memory address are used for indexing into the entry. Entry enable block 510 identifies an appropriate row of the cell map using address portion 505, which includes bits twenty-nine through forty-three of an incoming memory address. An address range is determined from address portion 505, which is used to select a row. As shown in FIG. 5, entry enable block 510 performs the following Equation I:

$$\text{Entry\_enable} = ((\text{ADDR AND MASK}) == \text{cmp}) \quad \text{Equation I}$$

As shown by Equation I, entry enable block 510 masks address portion 505 to discard the least significant bits of the address, and compares the masked address to "cmp," which is a comparison value or match value for the row. If the values in the comparison are equal, Entry_enable is assigned a logical true value, indicating a matching row. If the values are not equal, Entry_enable is assigned a logical false value, indicating a non-matching row.

Once a row is selected, bits six through eleven of the memory address are used to identify one of the sixty-four entry items within that row of the cell map, and a "CELL" and "Cell_Addr" are determined and output. "CELL" represents a cell ID for uniquely identifying cells, and "Cell_Addr" represents a cell address, which is described in further detail below. As shown in FIG. 5, address portion 515 includes address bits six through eleven and twenty-nine through forty-two, which are used to determine the appropriate cell ID and cell address. Additional table entry items can be selected through additional inputs as shown by address input 520. As shown in FIG. 5, a column is selected by performing a comparison like that shown in the following Equation II:

$$\text{Column\_Select} = (\text{ADDR}[11:6] == 0x0)$$

As can be seen from Equation II, bits six through eleven of the memory address are compared to a hexadecimal value corresponding to the column (e.g., 0x0 in this case, which corresponds to the first column). If the values being compared are equal, Column_Select contains a logical true value indicating a match. If the values being compared are not equal, Column_Select contains a logical false value indicating no match.

The use of the comparator and the mask in entry enable block 510 will be described in further detail with reference to FIG. 6. FIG. 6 shows a binary count representing decimal numbers from 0 to 16. The decimal range from 0 to 16 has been broken up into four different groups: Group 605 containing numbers 0 through 3; group 610 containing numbers 4 through 7; group 615 containing numbers 8 through 11; and group 620 containing numbers 12 through 15. In order for the mask to be used efficiently, a way to identify the different groups is necessary. In this case, it can be seen that the first two bits, or the two most significant bits (the two left-most bits) can be used to differentiate between the various groups. The four numbers displayed in group 605 each start with 00; each of the numbers in group 610 start with 01; each of the numbers in group 615 start with 10; and each of the numbers in group 620 start with 11. A mask is therefore established that consists of 1100. For each bit of interest a "1" is placed, and for each bit not of interest, or "don't care" a "0" is placed. The comparator is set equal to the starting address of the memory block. The mask is used to decide in which of the four groups, 605 through 620, the desired sequence of bits resides. A comparison between the two most significant bits will determine a specific row within the cell map.

To further illustrate the use of the comparator and the mask, several examples will be examined. Referring to FIG. 7, a node contains four cells, where cell 0 has five GB, cell 1 has three GB, cell 2 has three GB, and cell 3 has three GB of memory. In hexadecimal notation, one GB equals 0X000_40000000. Interleaving entry 0 of FIG. 7 would contain two GB from each of the four cells for a total of eight GB of memory. This memory block would go from zero GB up to eight GB. The comparator would be equal to 0X000_00000000. The value for the mask would be determined by identifying the bits that need to be examined to decide if the memory location is greater than eight GB. In each bit position that must be examined to decide if the value is over eight GB, a "1" would be placed. So in hexadecimal notation, the mask would be equal to 0Xffe_00000000. Since bits represented by the eight least significant numbers in the hexadecimal notation are not necessary to determine whether the value of the memory location is over eight GB, they do not need to be examined. The mask therefore only contains the bit positions that need to be examined to decide if the memory value from one of the memory accessing-devices is over eight GB or not. With this mask and comparator established, any access in the range of zero to eight GB will activate only interleaving entry 0. Within the appropriate row of the corresponding cell map, the cell numbers may be identified as 0, 1, 2, 3, 0, 1, 2, 3. This is similar to row 305 in FIG. 3. This configuration would achieve a four-way interleaving between cells 0 through 3. For interleaving entry 1, again all four cells are used, but this time, only one GB of memory from each cell is used. In this case, the comparator value is equal to 0X002_00000000, which is equivalent to eight GB. This is the starting value for this interleaving entry. The mask value in this case is 0Xfff_00000000. Once interleaving entry 1 has been established, two GB remain in cell 0.

In general, interleaving is performed over the largest blocks first and then subsequent interleave blocks are smaller in size. The two GB remaining in cell 0 would normally be broken up into one GB chunks as shown in FIG. 7. However, in this case, the twelve GB contained in interleaving entry 0 and interleaving entry 1 is divisible by the two GB remaining in cell 0. Therefore, interleaving entry 2 will contain the 2 GB of memory left in cell 0 and the comparator value will be 0X003_00000000, which is twelve GB, and the mask value will be 0Xfff_80000000.

As a final example, if, as shown in FIG. 8, a node contained three cells, each of which contained two GB of memory, interleaving would be performed as follows. For interleaving entry 0, the comparator would be 0X000_00000000, or zero GB. The mask would be 0Xfff_80000000. This allows interleaving between the first GB of cell 0 and the first GB of cell 1. The row entry for this case would consist of 0 followed by 1, alternating throughout the length of the row. This interleaves two ways over the first two GB of memory, again, one GB from cell 0 and one GB from cell 1.

For interleaving entry 1, the comparator value would be 0X000_80000000, or equal to two GB. The mask value for this would be 0Xfff_80000000. The corresponding cell map row would be alternating 1's and 2's throughout the length of the row, which allows interleaving two ways over the second GB from cell 1 and the first GB from cell 2.

Interleaving entry 2 has a comparator value of 0X0001_00000000, which is equal to four GB. The mask value is 0Xfff_80000000. The corresponding row within the cell map for this interleaving entry would be alternating 2's and 0's throughout the length of the row. This interleaving entry interleaves two ways over cells 2 and 0, and contains the last two GB of memory.

In one embodiment, the cell controller acquires more information from a cell map entry item than just a cell ID. For instance, there could be several cell map entry items that direct the cell controller to cell 0. The memory contained in cell 0 may have been broken out among various interleaving entries. In one embodiment, a cell map entry item also supplies the cell controller with an indication of where within cell 0's memory the required information is stored. In one form of the invention, a CELL_ADDR, or cell address, is used to direct the cell controller to a specific five hundred and twelve megabyte (MB) region within a cell memory for specific memory access. One embodiment of a cell address equation is provided in the following Equation III:

$$\text{CELL\_ADDR} = ((\text{ADDR}[42:29]\,\&\,\text{CHUNK\_MASK}) >> \text{interleave} + \text{CHUNK\_START} \qquad \text{Equation III}$$

Address bits twenty-nine through forty-two are used in determining where to start reading data from in a specific cell. The CHUNK_MASK contained in Equation III is the inverse of the mask previously discussed. The purpose of the CHUNK_MASK is to direct the cell controller to the right portion of a block of memory. The masked address portion is right shifted (represented by the symbol ">>") to eliminate bits that have been used for interleaving (represented in Equation III as "interleave"). If the cell map table had contained eight columns, three interleaving bits would be used to identify a column. If the cell map had sixteen columns, four bits would be used for identifying a column.

CHUNK_START is the amount of memory that has been dedicated or previously used by other interleaving entries. For example, referring back to interleaving entry 1 of FIG. 2, interleaving entry 1 came after interleaving entry 0 had occupied two GB from each of the four cells. Therefore, if the second two GB portion of cell 0 is being addressed, the CHUNK_START would be the two GB which were contained in interleaving entry 0. Alternatively, still referring to FIG. 2, interleaving entry 5, which contained two GB in cell 0 and two GB in cell 1, would have a CHUNK_START of four GB in both cell 0 and cell 1. In summary, the CELL_

ADDR equation uses address bits from the memory accessing device, adds an amount of memory equal to the offset to arrive at the specific memory location within a given block, right shifts to eliminate bits that have already been used in interleaving and are no longer necessary to determine the location within the block, and adds cell memory that has been dedicated to interleaving within other interleaving entries.

Figure 9:
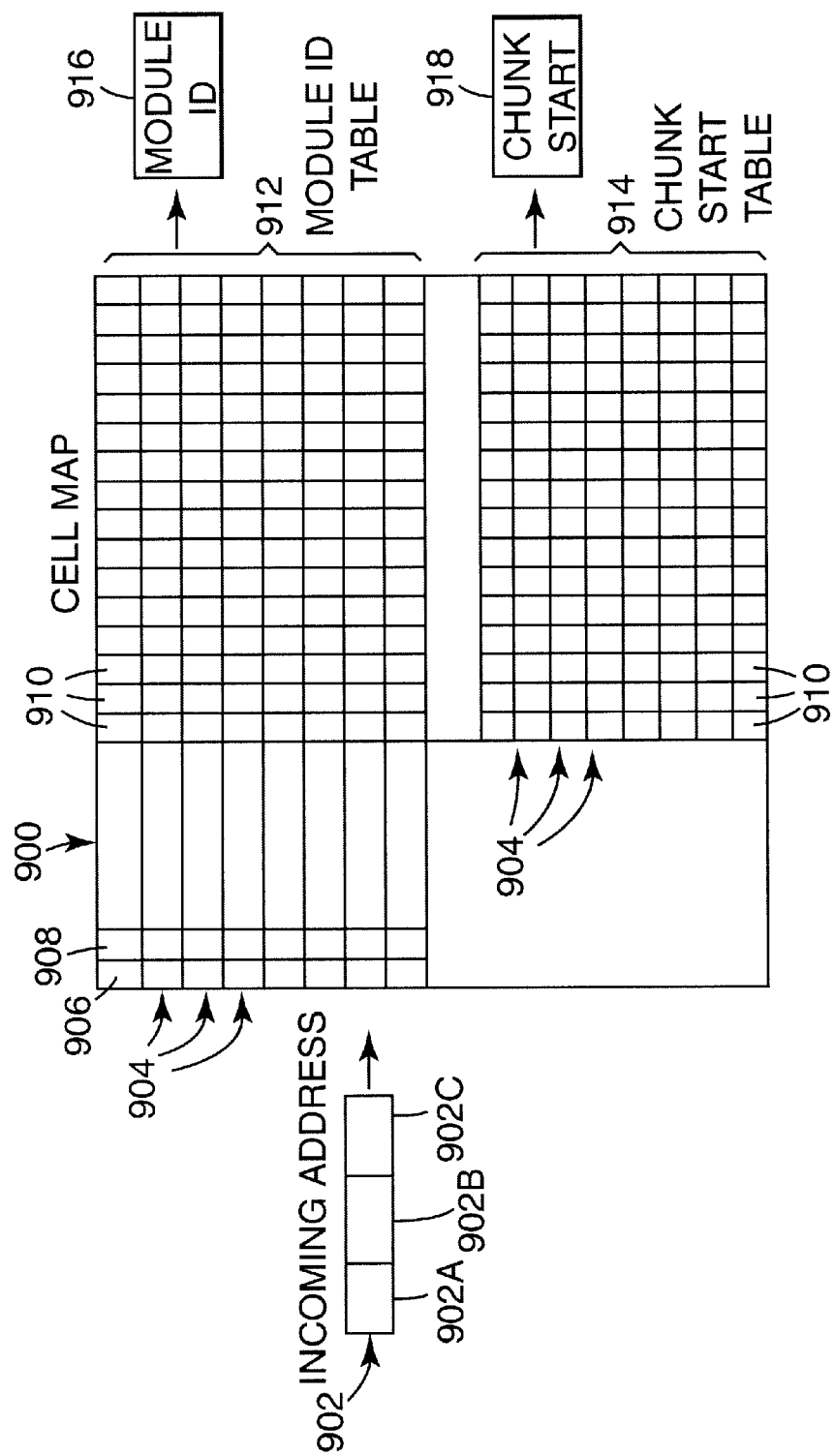
FIG. 9 is a diagram of a cell map for providing memory interleaving and I/O virtualization according to one embodiment of the present invention.

FIG. 9 is a diagram of one embodiment of a cell map 900. Cell map 900 includes module ID table 912 and chunk start table 914, each including a plurality of entries 904. Each entry 904 includes a plurality of entry items 910. In an alternative embodiment, module ID information and chunk start information may be incorporated into a single table. In another alternative embodiment, cell map 900 does not include a chunk start table 914. The number of entry items 910 in each entry 904 is based on the number of ways of interleave. For example, for sixteen-way interleaving, module ID table 912 and chunk start table 914 will each include at least sixteen entry items 910 per entry 904 (as shown in FIG. 9). And for sixty-four-way interleaving, module ID table 912 and chunk start table 914 will each include at least sixty-four entry items 910 per entry 904. In one embodiment, each entry item 910 in the module ID table 912 includes an eight-bit module ID value for identifying a destination module, and each entry item 910 in the chunk start table 914 includes a chunk start value, which is used to identify a memory location. Based on each received incoming address 902, an appropriate module ID value 916 and chunk start value 918 are identified and output from cell map 900 as described below.

The following Table I includes pseudocode for implementing one embodiment of a cell map based system:

TABLE I

1. Incoming_Address[49:0]
2. Address Match[49:29]
3. Address Mask[49:29]
4. Module_id_table_in_entry[Max_ways of interleave in entry * Bits_per_module_id]
5. Chunk_start_table_in_entry[Max_ways of interleave in entry * Number of bits required to address all 0.5 GB chunks]
6. Hit_for_that_entry = ((Incoming Address[49:29]] & Address Mask[49:29]) == Address Match[49:29])
7. Physical_destination_module = Module_id_table_in_entry [Incoming_Address[9:6]]
8. Chunk_start = Chunk_start_table_in_entry [Incoming_Address[9:6]]

For the above Table I, it is assumed that: The address size implementation is fifty bits (i.e., bits zero through forty-nine); each entry 904 is sixteen-way interleaved (therefore requiring four bits for indexing inside an entry 904); the system is performing single cache line interleaving; the cache line size is sixty-four bytes (so address bits six through nine are used for indexing inside an entry 904); there will be approximately thirty-two to sixty-four entries 904 provided at each processor interface; and the minimum addressable memory is a half of a GB (so the Address Mask uses bits twenty-nine through forty-nine).

It will be understood that the above assumptions are based on one example system, and that modifications may be made based upon the particular implementation. For example, if the cache line size were one hundred and twenty-eight bytes rather than sixty-four bytes, bits seven through ten of the incoming address 902 would be used for indexing inside an entry 904. If the cache line size were two hundred and fifty-six bytes, bits eight through eleven of the incoming address 902 would be used for indexing inside an entry 904. Each doubling of the cache line size would shift each of the four indexing bits to the left one bit position. As another example, if the minimum addressable memory were sixty-four megabytes (MB) rather than half a GB, the Address Mask would use bits twenty-four through forty-nine rather than twenty-nine through forty-nine. In addition to different cache line sizes and different minimum addressable memory sizes, other changes may be made, including, but not limited to, different address sizes, multiple cache line interleaving rather than single cache line interleaving, and a different number of ways of interleave.

The first item listed in Table I is Incoming Address[49:0], which is represented in FIG. 9 as incoming address 902. In one embodiment, incoming address 902 is a processor address and includes fifty bits, which are numbered zero through forty-nine. Incoming address 902 includes first address portion 902A, second address portion 902B, and third address portion 902C.

The second item listed in Table I is Address Match [49:29]. In one embodiment, each entry 904 in a cell map 900 is associated with a particular value for Address Match [49:29].

The third item listed in Table I is Address Mask[49:29]. Address Mask[49:29] is used by a cell controller (e.g., cell controller 175) to extract relevant bits from an incoming address 902. In one embodiment, bits twenty-nine through forty-nine of an incoming address 902 are referred to as first address portion 902A. Cell controller 175 compares the masked first address portion 902A to Address Match values to identify a matching entry 904.

An entry 904 in module ID table 912 is represented by the fourth item listed in Table I, which is Module_id_table_ in_entry [Max_ways of interleave in entry *Bits_per_ module_id]. The value inside the brackets for Module_id table_in_entry represents the bit size of entries 904 in module ID table 912. Assuming that eight bits are used for each module ID (i.e., Bits_per_module_id=8) and that entries 904 are sixteen-way interleaved (i.e., Max_ways of interleave in entry=16), the number of bits required for each entry 904 in the module ID table 912 will be one hundred and twenty-eight (i.e., 8×16). For sixty-four-way interleave entries 904, the size of module ID table entries 904 will be five hundred and twelve bits (i.e., 64×8). Using eight bits per module ID allows unique identification of two hundred and fifty-six modules. Other numbers of bits per module ID may be used depending upon the particular implementation.

An entry 904 in the chunk start table 914 is represented by the fifth item listed in Table I, which is Chunk_start_table_ in_entry[Max_ways of interleave in entry * Number of bits required to address all 0.5 GB chunks]. The value inside the brackets for Chunk_start_table_in_entry represents the bit size of entries 904 in the chunk start table 914. Assuming that eight bits are used to address all half-gigabyte chunks, and that entries 904 are sixteen-way interleaved (i.e., Max_ ways of interleave in entry=16), the number of bits required for each entry 904 in the chunk start table 914 would be one hundred twenty-eight (i.e., 8×16). For sixty-four-way interleave entries 904, the size of chunk start table entries 904 will be five hundred twelve bits (i.e., 64×8).

The sixth item listed in Table I is Hit_for_that_entry= ((Incoming_Address[49:29]] & Address Mask[49:29])== Address Match[49:29]). In one embodiment, each entry 904 in cell map 900 is associated with a particular value for Address Match[49:29], and a hit equation like that listed in the sixth item of Table I is performed for each entry 904 in the cell map 900 until a hit is identified. The variable Hit_for_that_entry will contain either a logical true value or a logical false value depending on the comparison of (Incoming_Address[49:29]] & Address Mask[49:29]) and Address Match[49:29]. If the value for (Incoming_Address[49:29]] & Address Mask[49:29]) and the value for Address Match[49:29] are not equal, Hit_for_that_entry will be a logical false value, indicating a non-matching entry. If the value for (Incoming_Address[49:29]] & Address Mask[49:29]) and the value for Address Match[49:29] are equal, Hit_for_that_entry will be a logical true value, indicating a matching entry.

For each entry 904 in module ID table 912, there is a corresponding entry 904 in chunk start table 914. If a hit is generated for an entry 904, a module ID value 916 from the module ID table entry is output, and a chunk start number 918 from the corresponding chunk start table entry is output. In one embodiment, the chunk start number 918 is a half-gigabyte multiple for identifying a memory location within the memory identified by the module ID value 916. The equations for identifying the appropriate module ID value 916 and chunk start number 918 within an entry 904 are listed in the seventh and eighth items of Table I.

The seventh item listed in Table I is Physical_destination_module=Module_id_table_in_entry [Incoming_Address[9:6]]. As indicated by this item, bits six through nine of an incoming address 902 are used to identify one of the sixteen entry items 910 in a matching entry 904 in the module ID table 912. In one embodiment, bits six through nine of the incoming address 902 are referred to as third address portion 902C. The module ID value from the identified entry item 910 is stored in the variable Physical_destination_module. For a module ID table 912 with sixty-four-way interleave entries 904, the equation for indexing into a module ID table entry 904 would be: Physical_destination_module=Module_id_table_in_entry [Incoming_Address[11:6]]. In this case, third address portion 902C includes address bits six through eleven, which are used for indexing into a module ID table entry 904.

The eighth item listed in Table I is Chunk_start=Chunk_start_table_in_entry [Incoming_Address[9:6]]. As indicated by this item, the third address portion 902C of an incoming address 902 is used to identify one of the sixteen entry items 910 in a matching entry 904 in the chunk start table 914. The chunk start number from the identified entry item 910 is stored in the variable chunk_start. For a chunk start table 914 with sixty-four-way interleave entries 904, the equation for indexing into a chunk start table entry 904 would be: Chunk_start=Chunk_start_table_in_entry [Incoming_Address[11:6]]. In this case, third address portion 902C includes address bits six through eleven, which are used for indexing into a chunk start table entry 904. As described above, in one embodiment, the chunk start value is used in a cell address equation (e.g., Equation III) to identify a specific memory location.

To achieve I/O virtualization with a cell map, such as cell map 900, a mechanism is provided to differentiate between entries 904 that are used for memory and entries 904 that are used for I/O. Also, for I/O type entries 904, multiple options may be provided for choosing different sets of address bits for indexing into the module ID table 912. Thus, to differentiate between memory type entries and I/O type entries, and to provide additional indexing options for I/O, additional states are provided in the cell map 900. In one embodiment, when a cell map 900 includes a chunk start table 914, only memory type entries 904 include associated entries in the chunk start table 914, and chunk numbers are not used for I/O type entries 904.

In one embodiment, entries 904 in cell map 900 include a one-bit entry type identifier 906. In one form of the invention, if the value for the entry type identifier 906 is a zero, the entry 904 is a memory type entry, and if the value for the entry type identifier 906 is a one, the entry 904 is an I/O type entry. Also, in one embodiment, entries 904 include a two-bit index select identifier 908. The two bits for the index select identifier 908 provide four different possible values, which are used to select a set of address bits to index into the module ID table 912 for I/O type entries 904.

For a memory type entry 904 in cell map 900, the hit logic, module ID identification, and chunk start number identification, are the same as described above. Specifically, as shown in the sixth item of Table I, Hit_for_that_entry= ((Incoming_Address[49:29]] & Address Mask[49:29])== Address Match[49:29]). So bits twenty-nine through forty-nine (i.e., first address portion 902A) of the incoming address 902 are used to identify a matching entry 904 in the cell map 900. Also, as shown in the seventh and eighth items of Table I, bits six through nine (i.e., third address portion 902C) of the incoming address 902 are used to index into a memory type entry 904 in the module ID table 912 and a chunk start entry 904 in the chunk start table 914.

In one embodiment, for I/O type entries 904, the hit logic is the same as that used for memory type entries 904, but a smaller number of address bits are compared. In one form of the invention, this is achieved by masking more bits in the Address Match and Address Mask registers. Also, for I/O type entries 904, the index into module ID table 912 is selected differently than for memory type entries 904. The set of incoming address bits that are used for indexing into an I/O type entry 904, referred to as second address portion 902B, are selected based on the index select identifier 908 for that entry 904. The following Table II shows values for index select identifier 908 and the corresponding incoming address bits that are used for indexing according to one embodiment of the present invention:

TABLE II

| Index Select bit values | Address bits for indexing |
|---|---|
| 00 | Incoming_address[31:28]// Allows 256 MB per IO module |
| 01 | Incoming_address[35:32]// Allows 4 GB per IO module |
| 10 | Incoming address[37:34// Allows 16 GB per IO module |
| 11 | Incoming Address[39:36]// Allows 64 GB per IO module |

After a hit is determined (i.e., an entry 904 in cell map 900 has been identified based on first address portion 902A), a particular entry item 910 within the identified entry 904 is selected based on an index value. The following Table III includes pseudocode for indexing into an entry 904 in module ID table 912 according to one embodiment of the invention:

TABLE III

Switch(Index_select)
  Case 00: index_module_table_io = Incoming_address[31:28];
    break
  Case 01: index_module_table_io = Incoming_address[35:32];
    break
  Case 10: index_module_table_io = Incoming_address[37:34];
    break

TABLE III-continued

```
Case 11: index_module_table_io = Incoming_address[39:36];
    break
endofswitch
index_module_table_mem = Incoming Address[9:6]
switch(Entry_type)
Case MEM: index_module_table = index_module_table_mem
Case IO: index_module_table = index module_table_io
endofswitch
Physical Destination Module(type) =
    Module_id_table_in_entry[index_module_table]
```

The first "switch" code segment assigns a value to index_module_table_io based on the value of index select 908 for the matching entry 904. Next, a value is assigned to index_module_table_mem based on bits six through nine of the incoming address (i.e., third address portion 902C). The second "switch" code segment assigns a value to index_module_table based on the entry type 906 of the matching entry 904. If the entry 904 is a memory (MEM) type entry, index_module_table is assigned the value of index_module_table_mem. If the entry is an I/O type entry, index_module_table is assigned the value of index_module_table_io. Lastly, the assigned value for index_module_table is used as an index for the matching entry 904 (i.e., Module_id_table_in_entry) to identify one of the sixteen entry items 910 in the entry 904. The identified entry item 904 includes identification information for identifying a module, which is assigned to the variable "Physical Destination Module." For a memory type entry 904, a chunk start value from a corresponding entry 904 and entry item 910 in chunk start table 914 would also be identified as described above.

So depending on the type of a cell map entry 904, appropriate module information is extracted and used. In an alternative embodiment, multiple entries 904 could be concatenated to create virtualization for a larger number of modules.

One embodiment of the present invention provides virtualization of I/O modules 170 and memory interleaving using a cell map 900. In one form of the invention, the I/O modules 170 are I/O controllers that are each configured to control multiple I/O cards or devices, such as peripheral component interconnect (PCI) devices. Thus, if an incoming address 902 is directed to a first I/O module, and the cell map 900 is used to redirect the access to a second I/O module, the I/O devices below the second I/O module should look the same to the software as the I/O devices below the first I/O module. In an alternative embodiment, the virtualization may be extended to the I/O card or device level.

One form of the invention eliminates the need to design separate structures for memory interleaving and I/O virtualization, by using the same cell map infrastructure for both memory interleaving and I/O virtualization. In one embodiment of the invention, there is no limit to how many modules can be virtualized. One form of the invention enables systems to be created that allow I/O modules 170 to be changed without software intervention or with minimal support. In one embodiment, the invention provides more flexibility in virtualization of I/O than previous systems provided. Also, in one form of the invention, a single cell map entry 904 can be used to virtualize multiple I/O modules 170, and the cell map entries 904 can be used for memory and I/O purposes interchangeably.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of accessing a plurality of memories in an interleaved manner and a plurality of input/output modules using a contiguous logical address space, the method comprising:

providing at least one map table, the at least one map table including a plurality of entries, each entry including an entry type identifier and a plurality of entry items, each entry item including a module identifier, each entry being one of a memory type entry and an input/output type entry;

receiving a first logical address, the first logical address including a plurality of address bits;

identifying an entry in the at least one map table based on a first set of the address bits;

determining a type of the identified entry based on the entry type identifier of the identified entry;

identifying an entry item in the identified entry based on a second set of the address bits if the entry type identifier indicates an input/output type entry;

identifying an entry item in the identified entry based on a third set of the address bits if the entry type identifier indicates a memory type entry; and accessing a module identified by the module identifier of the identified entry item.

2. The method of claim 1, wherein each input/output type entry in the at least one map table further includes an index select identifier, the method further comprising:

identifying address bits to use for the second set of address bits based on the index select identifier of the identified entry.

3. The method of claim 2, wherein each index select identifier is one of a plurality of index values, and wherein each one of the index values corresponds to an address block size.

4. The method of claim 1, wherein the first set of address bits include more significant bits than the second set of address bits, and wherein the second set of address bits include more significant bits than the third set of address bits.

5. The method of claim 1, and further comprising:

storing a plurality of memory offset values in the at least one map table;

identifying one of the memory offset values based on the first logical address; and wherein the module identified by the module identifier of the identified entry item is accessed at a memory location based at least in part on the identified memory offset value if the entry type identifier indicates a memory type entry.

6. The method of claim 1, wherein the first logical address is a processor address.

7. The method of claim 1, wherein the at least one map table is organized into a plurality of rows and a plurality of columns, and wherein each row corresponds to one of the plurality of entries and columns within a row correspond to entry items.

8. The method of claim 1, and further comprising:
providing a multi-bit mask value;
providing a plurality of multi-bit match values;
extracting the first set of address bits from the first logical address using the multi-bit mask value; and
comparing the extracted first set of address bits to the plurality of multi-bit match values to identify a match.

9. The method of claim 1, wherein the memories include a plurality of memory segments, with each of the memories including at least one of the memory segments, the memory segments organized into groups, with each of the groups including memory segments having a uniform size, and wherein each memory type entry in the at least one map table corresponds to one of the groups.

10. A method of mapping a contiguous logical address space to a plurality of modules, the plurality of modules including memories and input/output modules, each logical address in the logical address space including first, second, and third address portions, the method comprising:
providing a map table, the map table including a plurality of entries, each entry including an entry type identifier and a plurality of entry items, each entry being one of a memory type entry and an input/output type entry, and wherein each entry item includes a module identifier for identifying one of the plurality of modules;
associating a set of logical addresses with each entry, wherein the set of logical addresses associated with each individual entry include a common value for the first address portion, the common value for the first address portion being different for each entry; and
indexing entry items within each entry based on one of the second and the third address portions of the set of logical addresses associated with the entry, wherein selection of the address portion used for indexing is based on the entry type identifier for the entry.

11. The method of claim 10, wherein each input/output type entry in the map table further includes an index select identifier, the index select identifier providing index selection information for determining address bits to use for the second address portion.

12. The method of claim 11, wherein each index select identifier is one of a plurality of index values, and wherein each different index value corresponds to a different address block size.

13. The method of claim 10, wherein the first address portion of logical addresses includes address bits that are more significant than address bits of the second address portion, and wherein the second address portion of logical addresses includes address bits that are more significant than address bits of the third address portion.

14. The method of claim 10, and further comprising:
storing a plurality of memory offset values in the map table, each memory offset value associated with one of the entry items in a memory type entry.

15. The method of claim 10, wherein the logical addresses are processor addresses.

16. The method of claim 10, wherein the map table is organized into a plurality of rows and a plurality of columns, and wherein each row corresponds to one of the plurality of entries and columns within a row correspond to entry items.

17. The method of claim 10, and further comprising:
identifying at least one memory segment in each of the plurality of memories, thereby identifying a plurality of memory segments; and
organizing the identified memory segments into groups, wherein each of the groups includes memory segments having a uniform size, and wherein each memory type entry in the map table corresponds to one of the groups.

18. A system for providing access to a plurality of modules using a contiguous logical address space, the modules including memories and input/output modules, the system comprising:
at least one map table, the at least one map table including a plurality of entries, each entry including an entry type identifier and a plurality of entry items, wherein the entries are each one of a memory type entry and an input/output type entry, and wherein each entry item identifies one of the plurality of modules; and
a controller for receiving logical addresses, the controller configured to identify an entry in the at least one map table based on a first portion of a received logical address, select an entry item in the identified entry based on the entry type identifier for the identified entry and a second portion of the received logical address, and output module identification information based on the module identified by the selected entry item.

19. The system of claim 18, wherein the second portion varies in location within the received logical address based on the type of the identified entry.

20. The system of claim 18, wherein each input/output type entry in the map table further includes an index select identifier, and wherein the controller is configured to select an entry item in an identified input/output type entry based on the index select identifier for the identified input/output type entry and the second portion of the received logical address, the second portion varying in location within the received logical address based on a value of the index select identifier.

21. The system of claim 20, wherein each index select identifier is one of a plurality of index values, and wherein each different index value corresponds to a different address block size.

22. The system of claim 18, wherein the first portion of the received logical address includes address bits that are more significant than address bits of the second portion.

23. The system of claim 18, wherein the at least one map table includes a plurality of memory offset values, each memory offset value corresponding to one of the entry items for memory type entries, and wherein the controller is configured to identify one of the memory offset values based on the received logical address if the identified entry is a memory type entry.

24. The system of claim 18, wherein the received logical address is a processor address.

25. The system of claim 18, wherein the at least one map table is organized into a plurality of rows and a plurality of columns, and wherein each row corresponds to one of the plurality of entries and columns within a row correspond to entry items.

26. The system of claim 18, wherein the controller is configured to mask the received logical address to extract the first logical address portion, and compare the extracted first logical address portion to a plurality of match values to identify an entry in the at least one map table.

27. The system of claim 18, wherein the memories include a plurality of memory segments, with each of the memories including at least one of the memory segments, the memory segments being organized into groups with each of the groups including memory segments having a uniform size, and wherein each memory type entry in the at least one map table corresponds to one of the groups.

* * * * *